(No Model.) 2 Sheets—Sheet 2.
A. G. TISDEL.
PHOTOGRAPHIC CAMERA.
No. 348,301. Patented Aug. 31, 1886.
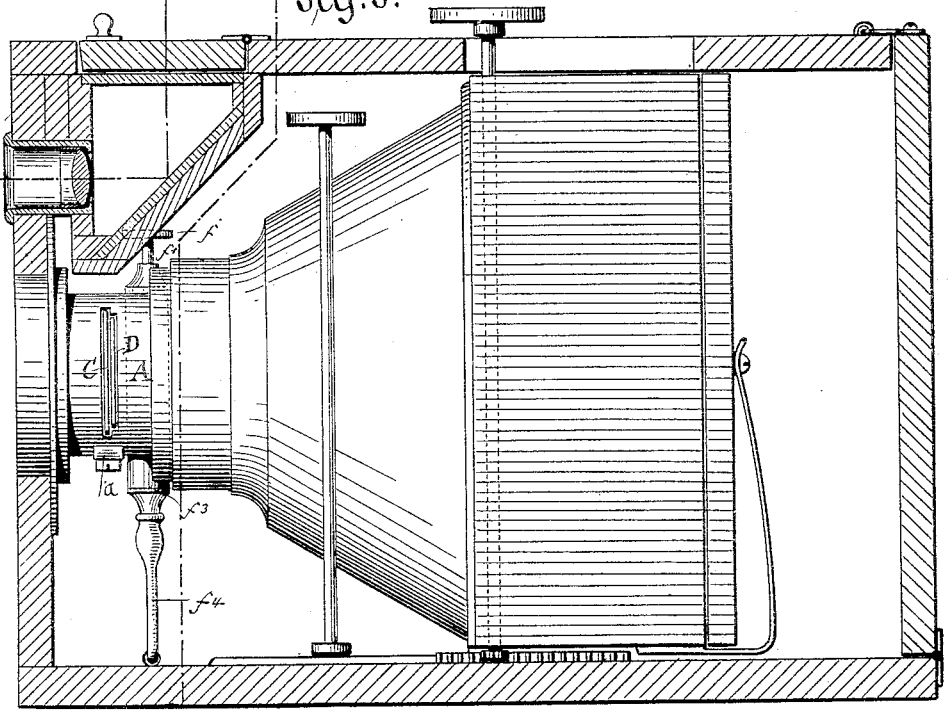
Fig. 3.
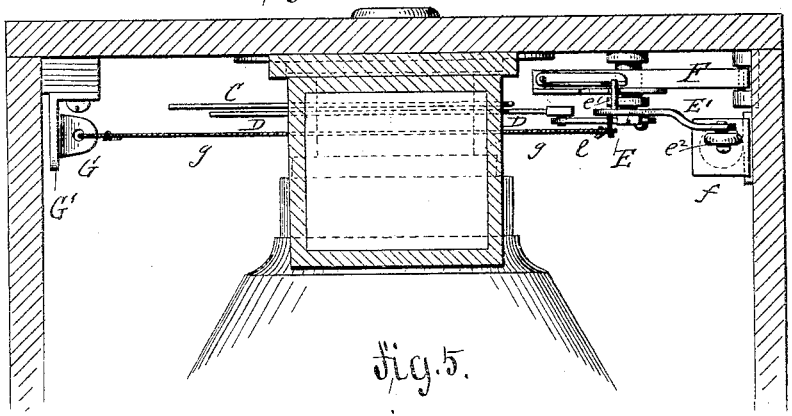
Fig. 4.
Fig. 5.
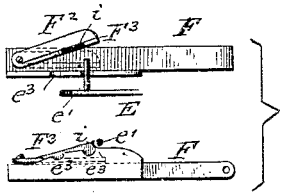
Fig. 6.
WITNESSES:
INVENTOR
Abner G. Tisdel
BY Goepel & Raegener
ATT

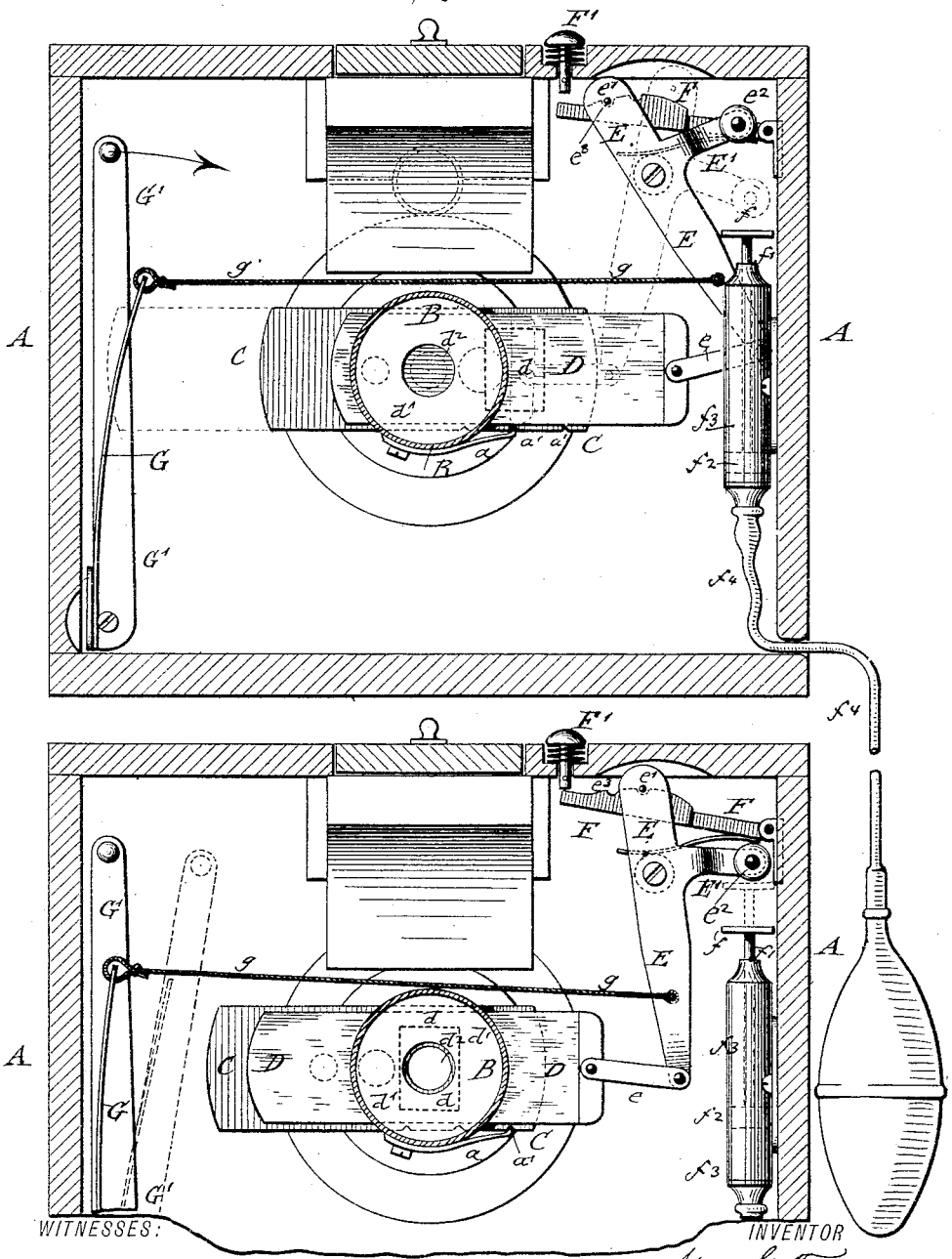

UNITED STATES PATENT OFFICE.

ABNER G. TISDEL, OF BROOKLYN, NEW YORK, ASSIGNOR OF ONE-HALF TO ELBERT A. WHITTLESEY, OF SAME PLACE.

PHOTOGRAPHIC CAMERA.

SPECIFICATION forming part of Letters Patent No. 348,301, dated August 31, 1886.

Application filed December 30, 1885. Serial No. 187,086. (No model.)

*To all whom it may concern:*

Be it known that I, ABNER G. TISDEL, of Brooklyn, in the county of Kings and State of New York, have invented certain new and useful Improvements in Photographic Cameras, of which the following is a specification.

This invention relates to certain improvements in photographic cameras, the improvements being more especially designed for that class known as "detective cameras," so as to facilitate the working of the shutter and simplify the construction of its operating mechanism; and the invention consists of a photographic camera in which a laterally-reciprocating shutter is guided transversely in slots of the lens-holding tube, and mechanism for setting the same pneumatically either for instantaneous or time exposure.

The invention consists, further, of the connection, with the laterally-reciprocating shutter and its setting mechanism, of a releasing mechanism and a spring, the tension of which is adjustable, so that the shutter can be passed at greater or less speed across the opening of the lens-tube, as will appear more fully hereinafter, and finally be pointed out in the drawings.

In the accompanying drawings, Figures 1 and 2 represent vertical transverse sections of my improved camera, both taken on line $x\ x$, Fig. 3, and showing an inside elevation of the shutter and its setting mechanism in position, respectively before and during exposure. Fig. 3 is a vertical longitudinal section of the camera. Fig. 4 is a top view of the same with the cover removed, and Figs. 5 and 6 are details of the setting mechanism.

Similar letters of reference indicate corresponding parts.

In the drawings, A represents the casing of my improved photographic camera of that class known as "detective cameras," and B the main tube of the same, within which is located the usual focusing-lens. Above the main tube is arranged an auxiliary tube and lens, an inclined mirror back of the same, and a horizontal ground glass plate above the mirror, by which the centering of the image of the object on the sensitized plate is facilitated. These parts, however, are well known and form no part of this invention.

The main tube B is provided with a laterally-adjustable diaphragm, C, that is provided with openings of different diameters. The diaphragm C is adjusted in slots of the main tube B in such a manner that either one of said openings may be arranged at the center of the tube B, and retained in that position by means of a spring-catch, $a$, said catch engaging notches $a'$ at the lower edge of the diaphragm C. Back of the diaphragm C is guided in slots of the main tube B a transverse shutter, D, which is provided with an oblong opening, $d$. Back of the shutter D is arranged, in the main tube B, a fixed diaphragm, $d'$, having a central opening, $d^2$, as shown clearly in Figs. 1 and 2. The shutter D is transversely guided in the slots of said main tube and set in position, so as to produce either an instantaneous or time exposure by means of a fulcrumed lever, E, the lower end of which is applied by a pivot-link, $e$, to the shutter D, and the upper end of which engages by a pin, $e'$, a notched setting lever or detent, F, that is pivoted to ears of the side wall of the casing A. The end of the detent F is engaged by a spring-actuated trigger, F', that is operated from the top of the casing. The trigger F' on being depressed releases the pin $e'$ of the lever E from the notches of the setting-lever F, thereby permitting the quick transverse movement of the shutter D by a spring, G, which is connected by a string, $g$, to that end of the shutter D to which the link $e$ is applied, as shown in Figs. 1 and 2. The tension of the spring G is adjusted by means of a pivot-lever, G', to the lower part of which the spring G is applied. By setting the lever G' to the right the tension of the spring is decreased, while by setting the lever G' to the left the tension of the same is increased. For instantaneous exposure the full tension of the spring is required, while for time exposure it is preferable to decrease the tension of the spring, so as to render the motion of the shutter slower.

The fulcrumed lever E is provided with a laterally-extending arm, E', that carries at its outer end an anti-friction roller, $e^2$. This anti-friction roller is acted upon by a plate, $f$, at the upper end of a piston-rod, $f'$, the piston $f^2$ of which is guided in a vertical cylinder, $f^3$, that is attached to the side wall of the casing A. The piston $f^2$, piston-rod $f'$, and plate $f$ are lifted by air-pressure, which is supplied by a rubber tube, $f^4$, which is connected with the lower end of the cylinder $f^3$ and passed through an opening in the side wall of the casing A, as shown in Fig. 4, said tube being connected with a rubber bulb, H, which when compressed forces the air into the cylinder and moves the piston in an upward direction, so that the plate $f$ at the upper end of the piston-rod $f'$ strikes against the anti-friction roller $e^2$, moves the arm $E'$ upward, oscillates the lever E and sets the pin $e'$ of the lever E into one of the notches, $e^3$, of the detent F, as shown in Fig. 1.

When an instantaneous exposure is desired, the pin $e'$ of the lever E is first set by the action of the pneumatic device into the outermost notch, $e^3$, of the detent F, as shown in Fig. 1. By pressing on the trigger the setting-lever E is released and the shutter passed quickly across the main tube by the action of the spring G, so that the shutter registers but for a moment with the openings $d'$ of the main tube B, admitting the passage of the light to the sensitized plate. When, however, a time exposure is desired, the rubber bulb, instead of being compressed quickly, is compressed slowly, so that the anti-friction-roller $e^2$ and its arm $E^2$ is lifted slowly by the plate $f$, and the lever E set by its pin $e'$ to the first notch, $e^3$, of the detent F, as shown in Fig. 2, in which case the opening in the shutter is set in line with the openings of the diaphragms C and $d'$, so as to permit the light to act on the sensitized plate of the camera. The exposure is terminated by another pressure on the bulb, by which the piston is again operated, the lever E set into the outermost notch of the detent F, and the shutter D moved entirely across the main tube. To return the shutter into its normal position, the setting-lever is released from the detent F by depressing the trigger F'.

To secure the reliable working of the setting-lever E and notched detent F, when the shutter is desired to be pneumatically worked for instantaneous or time exposure without the use of the trigger F', the detent F is provided with a pivoted auxiliary guard-plate, $F^2$, having a flange, $F^3$, which extends alongside of and above the notches of the detent F, so as to cover them by the flange, as shown in Fig. 6. The guard-flange $F^3$ has a stop, $i$, for the pin $e'$ of the setting-lever E, which stop prevents the pin $e'$ of the setting-lever E from engaging any one of the notches of the detent, as shown in Fig. 6.

For instantaneous exposure of the sensitized plate the rubber bulb is quickly compressed and released, so that the setting-lever E is oscillated by the piston-rod $f f'$ quickly, its pin $e'$ abutting against the stop $i$ and immediately returned again to its normal position. The shutter receives thereby a quick reciprocating motion across the opening of the lens-tube. For time-exposure the setting-lever is moved by the compression of the air-bulb against the stop $i$, and held in this position by keeping the bulb in compressed state until the exposure is to be terminated, when the bulb is released and the setting-lever and shutter returned to their normal position. For instantaneous exposures, in which the shutter is not desired to be reciprocated, but moved in one direction across the lens-tube, the auxiliary guard-plate $F^2$ is pushed back into the position shown in Fig. 5, so that the pin $e'$ of the setting-lever E can engage the notches $e^3$ of the detent, as before described.

By my improved photographic camera either instantaneous pictures or pictures with time-exposure can be made, the operating mechanism of the shutter being of simple construction and set pneumatically with great facility, and released either by means of the trigger or pneumatically by means of the air-bulb, as deemed most convenient.

Having thus described my invention, I claim as new and desire to secure by Letters Patent—

1. The combination of the main lens-tube, a laterally-reciprocating shutter, a fulcrumed setting-lever having a setting-pin and a laterally-extending arm, a spring connected to the setting-lever, a notched and spring-actuated detent, an elastic air-bulb, a cylinder, a piston, and a piston-rod operated by said rubber bulb, so as to operate the setting-lever and shutter, substantially as set forth.

2. The combination of the main lens-tube, a laterally-reciprocating shutter, a fulcrumed setting-lever having a lateral arm, a pneumatic device for oscillating said lever, a notched and spring-actuated detent for retaining said lever when set, and a spring connected to the setting-lever, and a pivoted lever attached to the spring for regulating the tension of the same, substantially as set forth.

3. The combination of the main lens-tube, a laterally-reciprocating shutter, a fulcrumed and spring-actuated setting lever connected to said shutter, a pneumatically-actuated piston for operating said lever, a notched and spring-pressed detent provided with a pivoted auxiliary guard plate and stop, whereby the setting lever and shutter can be pneumatically operated for instantaneous or time exposures, substantially as set forth.

In testimony that I claim the foregoing as my invention I have signed my name in presence of two subscribing witnesses.

ABNER G. TISDEL.

Witnesses:
 PAUL GOEPEL,
 CARL KARP.